(12) United States Patent
Patterson

(10) Patent No.: US 7,273,376 B1
(45) Date of Patent: Sep. 25, 2007

(54) ART KIT FOR PROMOTING RELIGIOUS COMFORT AND SPIRITUAL HEALING

(76) Inventor: Warnette B. Patterson, 5406 Cactus Ct., Fayetteville, NC (US) 28303

( * ) Notice: Subject to any disclaimer, the term of this patent is extended or adjusted under 35 U.S.C. 154(b) by 65 days.

(21) Appl. No.: 11/184,229

(22) Filed: Jul. 20, 2005

(51) Int. Cl.
   *G09B 19/00* (2006.01)
(52) U.S. Cl. ......................................... 434/245; 434/81
(58) Field of Classification Search ................. 434/81, 434/84, 85, 86, 96, 98, 245; 428/32.6, 32.62, 428/32.8
   See application file for complete search history.

(56) References Cited

U.S. PATENT DOCUMENTS

| | | | |
|---|---|---|---|
| 2,832,164 A * | 4/1958 | Hall et al. ................... 156/358 |
| 3,313,667 A * | 4/1967 | Flood .......................... 156/230 |
| 3,472,719 A * | 10/1969 | Lythgoe ....................... 156/236 |
| 4,310,313 A | 1/1982 | Brundige |
| 4,339,886 A | 7/1982 | Griffiths et al. |
| 4,530,665 A | 7/1985 | Colonel |
| 4,550,683 A * | 11/1985 | Jones .......................... 118/505 |
| 4,564,406 A * | 1/1986 | Binks .......................... 156/63 |
| 4,584,042 A | 4/1986 | Wandroik |
| 5,372,506 A * | 12/1994 | Hambright ................... 434/84 |
| 5,562,451 A * | 10/1996 | Wilcox et al. ............... 434/84 |
| 5,622,109 A * | 4/1997 | Ikejima et al. ......... 101/128.21 |
| 5,938,879 A | 8/1999 | Brown |
| 6,217,336 B1 * | 4/2001 | Matthews .................... 434/84 |
| 6,254,943 B1 * | 7/2001 | Osbourne .................... 428/29 |
| D486,526 S | 2/2004 | Diaz |

\* cited by examiner

*Primary Examiner*—Kurt Fernstrom

(57) ABSTRACT

A kit includes a body including detachably conjoined top and bottom layers. The top layer includes a heat-activated adhesive coating applied to a back side thereof. The body is provided with longitudinal sides, opposed end portions oriented perpendicular to the sides, and surface indicia illustrating biblical scriptures. The top layer is formed from transparent material. An applicator includes a handle and a roller rotatably connected thereto including anchor inserts provided with a notch for maintaining a connection with the handle. In use, a user detaches the top and bottom layers and positions the top layer onto the support surface, facing the adhesive coating down on the support surface and allowing the user to apply a heat source onto the top layer, thermally activating the adhesive coating. The roller is engaged along the top layer, distributing the adhesive coating along the support surface and eliminating air pockets.

9 Claims, 3 Drawing Sheets

ART KIT FOR PROMOTING RELIGIOUS COMFORT AND SPIRITUAL HEALING

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to art kits and, more particularly, to an art kit for promoting religious comfort and spiritual healing.

2. Prior Art

Heretofore, art kit arrangements have been proposed that include adhesive backed letters and numerals, alignment grids, and transfer sheets for decorating a preferred surface, such as a pillow. However, it is common knowledge that the individual letters may be supplied in quadrilateral block form to achieve spacing and alignment by juxtaposing adjacent blocks, which requires a separate backing for each letter that has to be separately removed for affixing of the letter or numeral to the desired substrate. This is time and energy consuming and discourages many novices from attempting to use such kits.

Alternately, the letters and numerals are arranged for partial adherence temporarily to the front side of a transfer sheet applied between the grid and the letters, with the transfer sheet being adhered to the grid by a separate adhesive coating on the grid. Such a transfer sheet is manually removed therefrom to shift the partially free letters to the substrate surface for adherence thereto of the letter free portions after which the transfer sheet is pulled free of the letters so that the remaining portions may be adhered to the substrate.

However, most commercially available lettering kits while providing a full selection of letters and numerals in a particular size for a particular font usually require that the user in making signs and the like, utilize selected pressure sensitive coated letters and numerals from the kit, to make their own layout guidelines on the substrate. The individual letters are individually applied to the substrate by the user who tries to achieve consistent alignment and spacing as best they can manually. The result is all too frequently shoddy and unprofessional looking in appearance. It would be more convenient to have whole pre-made words or phrases that can be transferred to a desired surface instead of having to construct the words from individual letters Often times, such art kits are utilized to construct gifts of sentimental value to the recipient. One of the best ways to make a gift memorable and to show how much one cares for the recipient is to display an encouraging message thereon. This is frequently accomplished by quoting Biblical scripture. It would be difficult though, as mentioned herein above, to construct an entire Bible verse from individual letters and then transfer those onto the pillow or other intended surfaces.

Accordingly, a need remains for an art kit for promoting religious comfort and spiritual healing in order to overcome the above-noted shortcomings. The present invention satisfies such a need by providing an art kit that has religious significance, is attractive in design, and reasonably priced. The finished product provides a decorative addition to any room and allows a homemaker to display their religious beliefs while reminding others of Jesus' love for them. Advantageously, various comforting or inspirational messages from the Bible can be stitched onto or applied with the art kit. Such messages could provide comfort and offer support during various difficult periods. The art kit for promoting religious comfort makes an ideal gift for housewarming parties, weddings, anniversaries, and birthdays.

BRIEF SUMMARY OF THE INVENTION

In view of the foregoing background, it is therefore an object of the present invention to provide an art kit for promoting religious comfort and spiritual healing. These and other objects, features, and advantages of the invention are provided by a kit for promoting biblical teachings and prayers.

The kit includes a body including a plurality of removably conjoined and coextensive top and bottom layers. Such a top layer includes a heat-activated adhesive coating applied to a back side thereof and directly intercalated between the top and bottom layers during non-operating conditions. The top layer is preferably formed from heat-conductive material for conveniently thermally cooperating with the heat source during application conditions. The top and bottom layers are detachable such that the adhesive coating effectively becomes exposed and directly affixable to a support surface. Such a bottom layer is preferably formed from disposable material. The body is provided with a centrally disposed longitudinal axis and includes a plurality of longitudinal sides equidistantly spaced from the axis and extending parallel thereto along a length of the body.

Such a body further includes axially opposed end portions oriented perpendicular to the axis and monolithically formed with the sides. The body is provided with surface indicia illustrating biblical scriptures thereon wherein the biblical scriptures are registered parallel to the longitudinal sides and the end portions so that the biblical teachings are displayed along an entire perimeter of the body and simulate a protective barrier around the top layer. Such a top layer is formed from transparent material so that the texture of the support surface can be visually identified after the top layer is affixed thereto.

The present invention further includes an applicator including a handle and a cylindrical roller rotatable and directly connected thereto. Such a roller is provided with opposed end portions that have a plurality of anchor inserts interfitted therein such that the anchor inserts become nested medially of the roller end portions. Each anchor insert is provided with a linear notch axially aligned with the roller wherein opposed end portions of the handle are directly intercalated therein for advantageously maintaining a secure connection therewith.

In use, a user detaches the top layer from the bottom layer and positions the top layer onto the support surface with the adhesive coating facing down on the support surface so that the user can directly apply a heat source onto a top surface of the top layer for thermally activating the adhesive coating. The roller is evenly distributed and directly engaged on the top layer for distributing the adhesive coating along the support surface and effectively eliminating undesirable air pockets therein.

A method for producing such a kit and which promotes biblical teachings and prayers includes the steps of providing a body including a plurality of removably conjoined top and bottom layers, and applying a heat-activated adhesive coating to a back side of the top layer. One detaches the top and bottom layers such that the adhesive coating becomes exposed and can be directly affixed to a support surface.

The method furthermore, provides the body with surface indicia illustrating biblical scriptures thereon wherein the biblical scriptures are registered parallel to the longitudinal sides and the end portions so that the biblical teachings are displayed along an entire perimeter of the body and simulate a protective barrier around the top layer. Also provided is an applicator including a handle and a cylindrical roller rotatable and directly connected thereto. Such a roller is provided with opposed end portions that have a plurality of anchor inserts interfitted therein such that the anchor inserts become nested medially of the roller end portions. Each anchor insert is provided with a linear notch axially aligned with the roller wherein opposed end portions of the handle are directly intercalated therein for maintaining a secure connection therewith.

In operation, the user detaches the top layer from the bottom layer and positions the top layer onto the support surface with the adhesive coating facing down on the support surface so that the user can directly apply a heat source onto a top surface of the top layer for thermally activating the adhesive coating. Next, the user distributes the adhesive coating along the support surface while eliminating undesirable air pockets therein. The top layer is preferably formed from heat-conductive material for thermally cooperating with the heat source during application conditions and the bottom layer may be formed from disposable material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
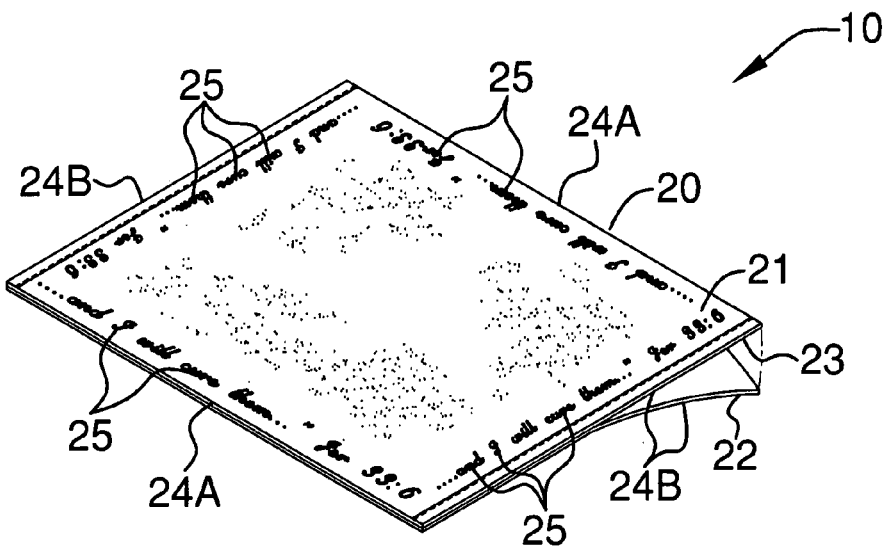
FIG. 1 is a perspective view showing the body portion of an art kit for promoting religious comfort and spiritual healing, illustrating detachable top and bottom layers, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime, double prime and triple numbers refer to alternate embodiments of such elements.

The kit and method of this invention is referred to generally in FIGS. 1-5 by the reference numeral 10 and is intended to provide an art kit for promoting religious comfort and spiritual healing. It should be understood that the kit and method 10 may be used to display many different types of Biblical messages and should not be limited in use to only displaying one message.

Referring initially to FIG. 1, the kit 10 includes a body 20 including a plurality of removably conjoined and coextensive top 21 and bottom 22 layers. Such a top layer 21 includes a heat-activated adhesive coating applied to a back side 23 thereof and directly intercalated, with no intervening elements, between the top 21 and bottom 22 layers during non-operating conditions. The top layer 21 is formed from heat-conductive material, which is critical for conveniently thermally cooperating with the heat source (not shown) during application conditions. The top 21 and bottom 22 layers are detachable, which is important such that the adhesive coating effectively becomes exposed and directly affixable, with no intervening elements, to a support surface (not shown). Such a bottom layer 22 is formed from disposable material, conveniently allowing same to be discarded after use. The body 20 is provided with a centrally disposed longitudinal axis and includes a plurality of longitudinal sides 24A equidistantly spaced from the axis and extending parallel thereto along a length of the body 20.

Still referring to FIG. 1, such a body 20 further includes axially opposed end portions 24B oriented perpendicular to the axis and monolithically formed with the sides. The body 20 is provided with surface indicia 25 that are essential for illustrating biblical scriptures thereon wherein the biblical scriptures are registered parallel to the longitudinal sides 24A and the end portions 24B so that the biblical teachings are displayed along an entire perimeter of the body 20 and simulate a protective barrier around the top layer 21. Of course, such surface indicia 25 may be positioned alternately and may illustrate any number of biblical scripture to convey various messages including, but not limited to, messages of encouragement, consolation, support, spiritual healing etc., as is obvious to a person of ordinary skill in the art. It is critical to use biblical scripture for these messages in order for the recipient to know of and be comforted by the scripture's divine origins.

Again referring to FIG. 1, such a top layer 21 is formed from transparent material so that the texture of the support surface can advantageously be visually identified after the top layer 21 is affixed thereto. This is especially advantageous in instances where the top layer 21 is attached to support surfaces like wood or colored and patterned material where one would wish to retain the visual identification of those support surfaces.

Figure 2:
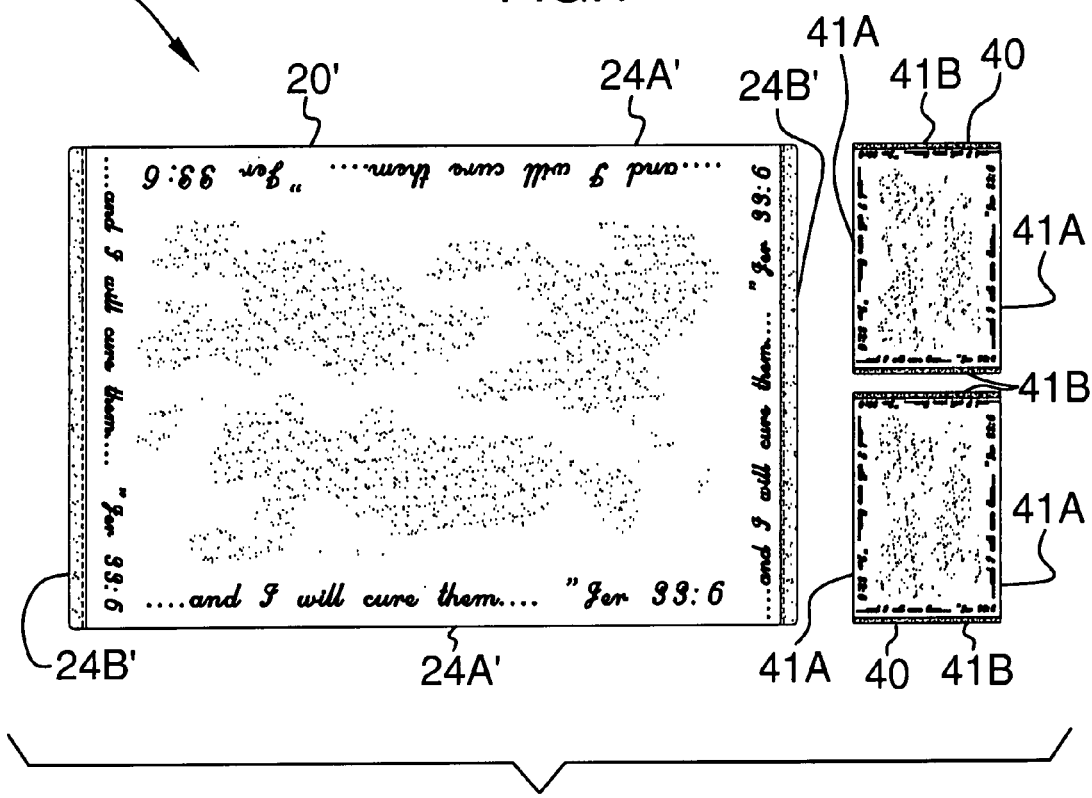
FIG. 2 is a top plan view showing an alternate embodiment of the kit shown in FIG. 1, illustrating a bedding set having embroidered prayers.

Referring to FIGS. 1 and 2, the present invention further includes an applicator 30 including a handle 31 and a cylindrical roller 32 rotatable and directly connected, with no intervening elements, thereto. Such a roller 32 is provided with opposed end portions 33 that have a plurality of anchor inserts 34 interfitted therein, which are important such that the anchor inserts 34 become nested medially of the roller end portions 33. Each anchor insert 34 is provided with a linear notch 35 axially aligned with the roller 32 wherein opposed end portions 36 of the handle 31 are directly intercalated, with no intervening elements, therein for advantageously maintaining a secure connection therewith.

In use, a user detaches the top layer 21 from the bottom layer 22 and positions the top layer 21 onto the support surface with the adhesive coating facing down on the support surface so that the user can directly apply a heat source onto a top surface of the top layer 21 for thermally activating the adhesive coating. The roller 30 is then directly engaged, with no intervening elements, on the top layer 21, which is essential and advantageous for evenly distributing the adhesive coating along the support surface and effectively eliminating undesirable air pockets therein. Elimination of such air pockets is essential for ensuring that the final product is aesthetically appealing and further ensures that the top layer 21 remains affixed to the support surface for an extended period of time.

A preferred method for producing a kit 10 which promotes biblical teachings and prayers includes the steps of providing a body 20 that includes a plurality of removably conjoined top 21 and bottom 22 layers. A heat-activated adhesive coating is applied to a back side 23 of the top layer 21, which is critical for allowing same to be attached to a support surface. One detaches the top 21 and bottom 22 layers such that the adhesive coating becomes exposed and can be directly affixed, with no intervening elements, to a support surface.

Furthermore, the method provides the body 20 with surface indicia 25 that are crucial for illustrating biblical scriptures thereon wherein the biblical scriptures are registered parallel to the longitudinal sides 24A and the end portions 24B so that the biblical teachings are displayed along an entire perimeter of the body 20 and simulate a protective barrier around the top layer 21.

The method also provides for an applicator 30 including a handle 31 and a cylindrical roller 32 rotatable and directly connected, with no intervening elements, thereto. Such a roller 32 is provided with opposed end portions 33 that have a plurality of anchor inserts 34 interfitted therein such that the anchor inserts 34 become nested medially of the roller end portions 33. Each anchor insert 34 is provided with a linear notch 35 axially aligned with the roller 33 wherein opposed end portions 36 of the handle 31 are directly intercalated, with no intervening elements, therein for maintaining a secure connection therewith.

In use, one detaches the top layer 21 from the bottom 22 layer and positions the top layer 21 onto the support surface with the adhesive coating facing down on the support surface so that the user can directly apply a heat source onto a top surface of the top layer 21 for thermally activating the adhesive coating. Next, the user distributes the adhesive coating along the support surface with the applicator 30 while eliminating undesirable air pockets therein. The top layer 21 is formed from heat-conductive material for thermally cooperating with the heat source during application conditions and the bottom layer 22 is formed from disposable material.

Referring to FIG. 2, in an alternate embodiment, a kit 10' includes a body 20' and a plurality of pillowcases 40 wherein biblical scriptures are registered parallel to the longitudinal sides 41A and the end portions 41B of the plurality of pillowcases 40 to display biblical indicia along the perimeter thereof. The body 20' includes biblical scriptures registered along longitudinal sides 24A' and end portions 24B' thereof.

Figure 3:
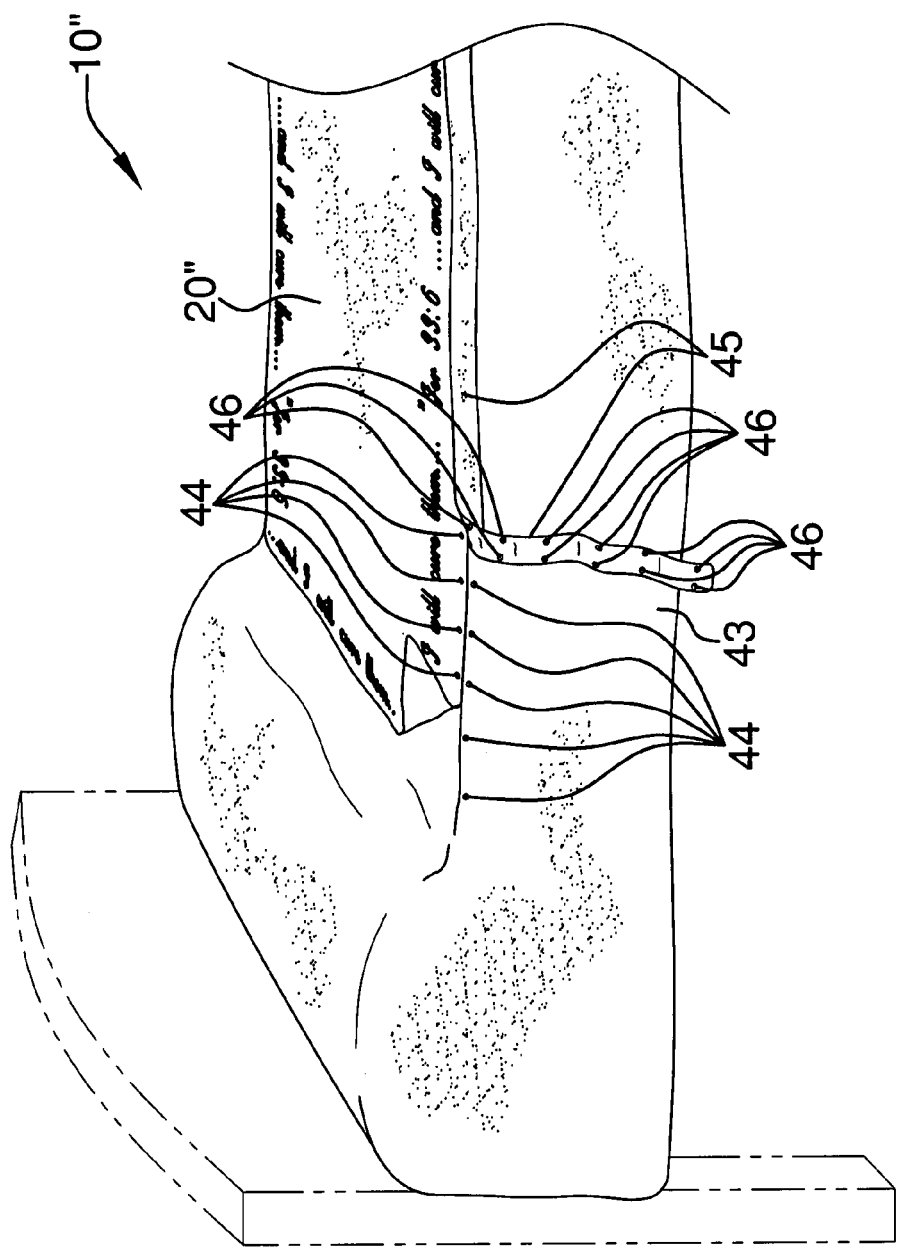
FIG. 3 is a perspective view of yet another embodiment of the kit shown in FIG. 1, illustrating a comforter having a detachable prayer cloth attached with fastening members.
Figure 4:
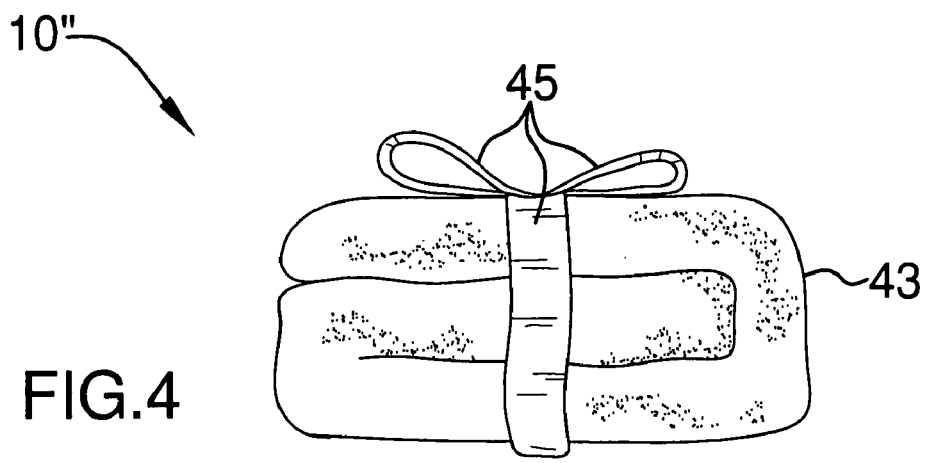
FIG. 4 is a side-elevational view of the kit shown in FIG. 3, illustrating the ribbon employed in the storage configuration of the prayer cloth.

Referring to FIGS. 3 and 4, in yet another embodiment, a kit 10" includes a comforter 43 and a body 20" having male fastening members 44 directly connected, with no intervening elements, thereto for removably engaging a ribbon 45. Such a ribbon 45 includes female fastening members 46 directly connected, with no intervening elements, for removably engaging the male fastening members 44 of the comforter 43 and the body 20" respectively, so that the body 20" becomes positioned on top of the comforter 43. The ribbon 45 is used to package the body 20" when operating conditions call for storage of such a body 20", as is best shown in FIG. 4. This is a necessary feature of the invention as it allows the kit 10" to advantageously be engageable with the comforter 43, to maintain the position of the body 20" and to allow the body 20" to be packaged for storage, thereby utilizing a minimum of space.

Figure 5:
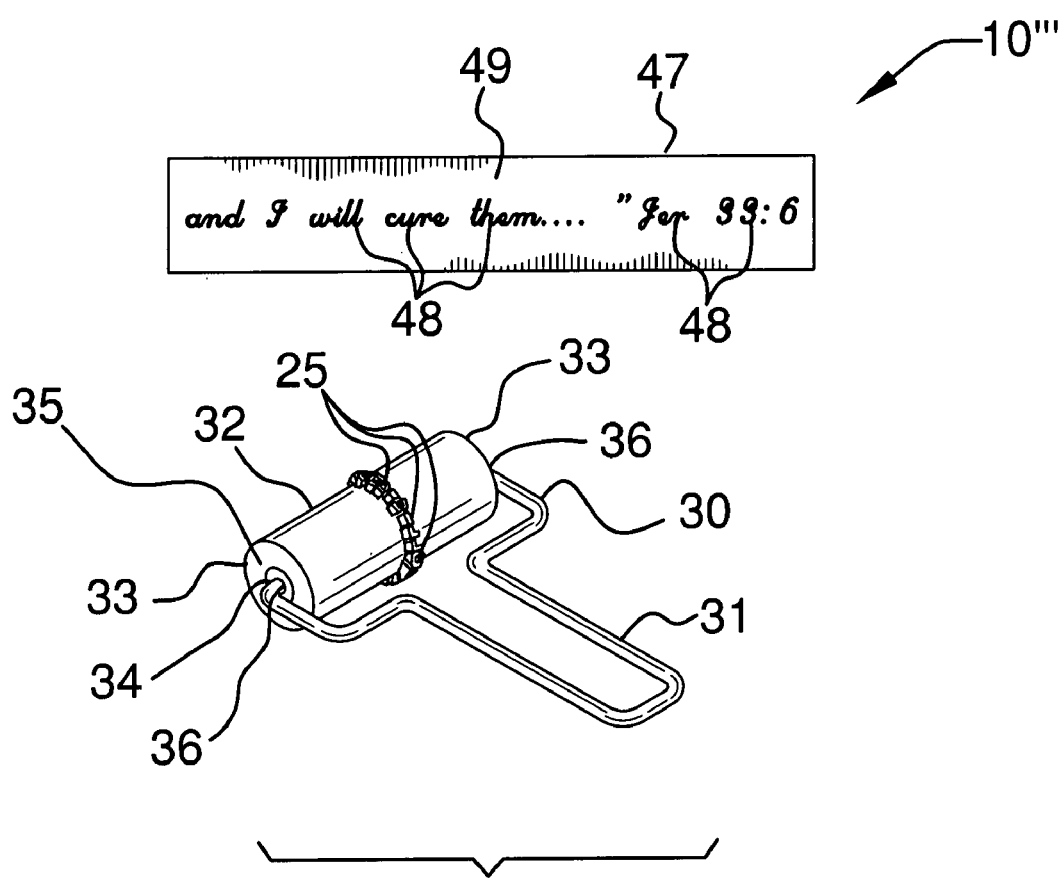
FIG. 5 is a perspective view showing a further embodiment of the kit, wherein an applicator associated with a heat-activated adhesive prayer is illustrated.

Referring to FIG. 5, in an even further embodiment, a kit 10''' includes an applicator 30 including a handle 31 and a cylindrical roller 32 rotatable and directly connected, with no intervening elements, thereto. Such a cylindrical roller 32 includes indicia 33 medially spaced thereon for application of such indicia 33 on a surface. The kit 10''' further includes a heat-activated strip 47 with surface indicia 48 relating Biblical scriptures registered on a top surface 49 thereof for application to a product of the user's choice. Of course, the surface indicia 48 may portray a variety of different Biblical scriptures and encouraging messages, as is obvious to a person of ordinary skill in the art.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A kit for promoting biblical teachings and prayers, said kit comprising:
    a body including a plurality of removably conjoined top and bottom layers, said top layer including a heat-activated adhesive coating applied to a back side thereof and directly intercalated between said top and bottom layers during non-operating conditions, said top and bottom layers being detachable such that said adhesive coating becomes exposed and directly affixable to a support surface, said body being provided with a centrally disposed longitudinal axis, said body including a plurality of longitudinal sides equidistantly spaced from the axis and extending parallel thereto along a length of said body, said body further including axially opposed end portions oriented perpendicular to the axis and monolithically formed with said sides, said body being provided with surface indicia illustrating biblical scriptures thereon wherein said biblical scriptures are registered parallel to said longitudinal sides and said end portions so that the biblical teachings are displayed along an entire perimeter of said body and simulate a protective barrier around said top layer, said top layer being formed from transparent material so that the texture of the support surface can be visually identified after said top layer is affixed thereto; and an applicator including a handle and a cylindrical rotatable roller directly connected thereto, said roller being provided with opposed end portions having a plurality of anchor inserts interfitted therein such that said anchor inserts become nested medially of said roller end portions, each said anchor inserts being provided with a linear notch axially aligned with said roller wherein opposed end portions of said handle are directly intercalated therein for maintaining a secure connection therewith;

wherein a user detaches said top layer from said bottom layer and positions said top layer onto the support surface with said adhesive coating facing down on the support surface so that the user can directly apply a heat source onto a top surface of said top layer for thermally activating said adhesive coating, said roller being evenly distributed and directly engaged on said top layer for distributing said adhesive coating along the support surface and eliminating undesirable air pockets therein.

2. The kit of claim 1, wherein said top layer is formed from heat-conductive material for thermally cooperating with the heat source during application conditions.

3. The kit of claim 1, wherein said bottom layer is formed from disposable material.

4. A kit for promoting biblical teachings and prayers, said kit comprising:

a body including a plurality of removably conjoined and coextensive top and bottom layers, said top layer including a heat-activated adhesive coating applied to a back side thereof and directly intercalated between said top and bottom layers during non-operating conditions, said top and bottom layers being detachable such that said adhesive coating becomes exposed and directly affixable to a support surface, said body being provided with a centrally disposed longitudinal axis, said body including a plurality of longitudinal sides equidistantly spaced from the axis and extending parallel thereto along a length of said body, said body further including axially opposed end portions oriented perpendicular to the axis and monolithically formed with said sides, said body being provided with surface indicia illustrating biblical scriptures thereon wherein said biblical scriptures are registered parallel to said longitudinal sides and said end portions so that the biblical teachings are displayed along an entire perimeter of said body and simulate a protective barrier around said top layer, said top layer being formed from transparent material so that the texture of the support surface can be visually identified after said top layer is affixed thereto; and an applicator including a handle and a cylindrical roller rotatable and directly connected thereto, said roller being provided with opposed end portions having a plurality of anchor inserts interfitted therein such that said anchor inserts become nested medially of said roller end portions, each said anchor inserts being provided with a linear notch axially aligned with said roller wherein opposed end portions of said handle are directly intercalated therein for maintaining a secure connection therewith;

wherein a user detaches said top layer from said bottom layer and positions said top layer onto the support surface with said adhesive coating facing down on the support surface so that the user can directly apply a heat source onto a top surface of said top layer for thermally activating said adhesive coating, said roller being evenly distributed and directly engaged on said top layer for distributing said adhesive coating along the support surface and eliminating undesirable air pockets therein.

5. The kit of claim 4, wherein said top layer is formed from heat-conductive material for thermally cooperating with the heat source during application conditions.

6. The kit of claim 4, wherein said bottom layer is formed from disposable material.

7. A method for producing a kit which promotes biblical teachings and prayers, said method comprising the steps of:

(1) providing a body including a plurality of removably conjoined top and bottom layers;

(2) applying a heat-activated adhesive coating to a back side of said top layer;

(3) detaching said top and bottom layers such that said adhesive coating becomes exposed and directly affixable to a support surface;

(4) providing said body with surface indicia illustrating biblical scriptures thereon wherein said biblical scriptures are registered parallel to said longitudinal sides and said end portions so that the biblical teachings are displayed along an entire perimeter of said body and simulate a protective barrier around said top layer;

(5) providing an applicator including a handle and a cylindrical roller rotatable and directly connected thereto, said roller being provided with opposed end portions having a plurality of anchor inserts interfitted therein such that said anchor inserts become nested medially of said roller end portions, each said anchor inserts being provided with a linear notch axially aligned with said roller wherein opposed end portions of said handle are directly intercalated therein for maintaining a secure connection therewith;

(6) positioning said top layer onto the support surface with said adhesive coating facing down on the support surface so that the user can directly apply a heat source onto a top surface of said top layer for thermally activating said adhesive coating; and (7) distributing said adhesive coating along the support surface and eliminating undesirable air pockets therein.

8. The method of claim 7, wherein said top layer is formed from heat-conductive material for thermally cooperating with the heat source during application conditions.

9. The method of claim 7, wherein said bottom layer is formed from disposable material.

* * * * *